United States Patent [19]

Davis et al.

[11] Patent Number: 4,712,210

[45] Date of Patent: Dec. 8, 1987

[54] SIGNAL CONVERSION CIRCUIT FOR INTERCONNECTING COAXIAL CABLE AND A TWISTED PAIR

[75] Inventors: Loren G. Davis, New Brighton; Steven R. Schmitz, St. Bonifacius; Dennis L. Tauer, Jordan, all of Minn.

[73] Assignee: Lee Data Corporation, Eden Prairie, Minn.

[21] Appl. No.: 648,061

[22] Filed: Sep. 7, 1984

[51] Int. Cl.[4] .............................................. H04J 3/02
[52] U.S. Cl. .............................. 370/77; 340/347 DD; 375/17
[58] Field of Search .................. 370/96, 31, 77, 110.1; 340/347 DD; 375/17

[56] References Cited

U.S. PATENT DOCUMENTS

| | | | |
|---|---|---|---|
| 3,098,215 | 7/1963 | Waite | 370/96 |
| 3,821,478 | 6/1974 | Hillmann, Jr. et al. | 370/110.1 |
| 3,906,153 | 9/1975 | Polischuk-Swatschenko | 370/31 |
| 4,254,501 | 3/1981 | Griffith et al. | 370/31 |
| 4,380,065 | 4/1983 | Hirtle et al. | 370/96 |
| 4,547,880 | 10/1985 | De Vita et al. | 370/96 |

Primary Examiner—Douglas W. Olms
Attorney, Agent, or Firm—Dorsey & Whitney

[57] ABSTRACT

In typical multi-terminal computer installations, each display terminal is connected to a controller by a coaxial cable (commonly referred to as coax) with a concommitant limitation on the distance from the controller that any terminal can be placed, normally in the range of a few thousand feet. The disclosed invention eliminates the need for a direct coaxial cable connection between the controller and the terminals. In the form of the invention described, two interface units are utilized. The first interface unit is connected to the controller by a single coaxial cable. That interface unit is connected to a second interface unit by a single pair of twisted wire, such as a telephone line. Connected to the second interface unit can be as many as eight coaxial connections to display terminals. Using half duplex operation the controller can then address and poll each of the connected display terminals to transmit and receive data. The distance between the interface circuits can be as great as five thousand feet. If additional distance is required, additional sets of interface units can be used.

19 Claims, 7 Drawing Figures

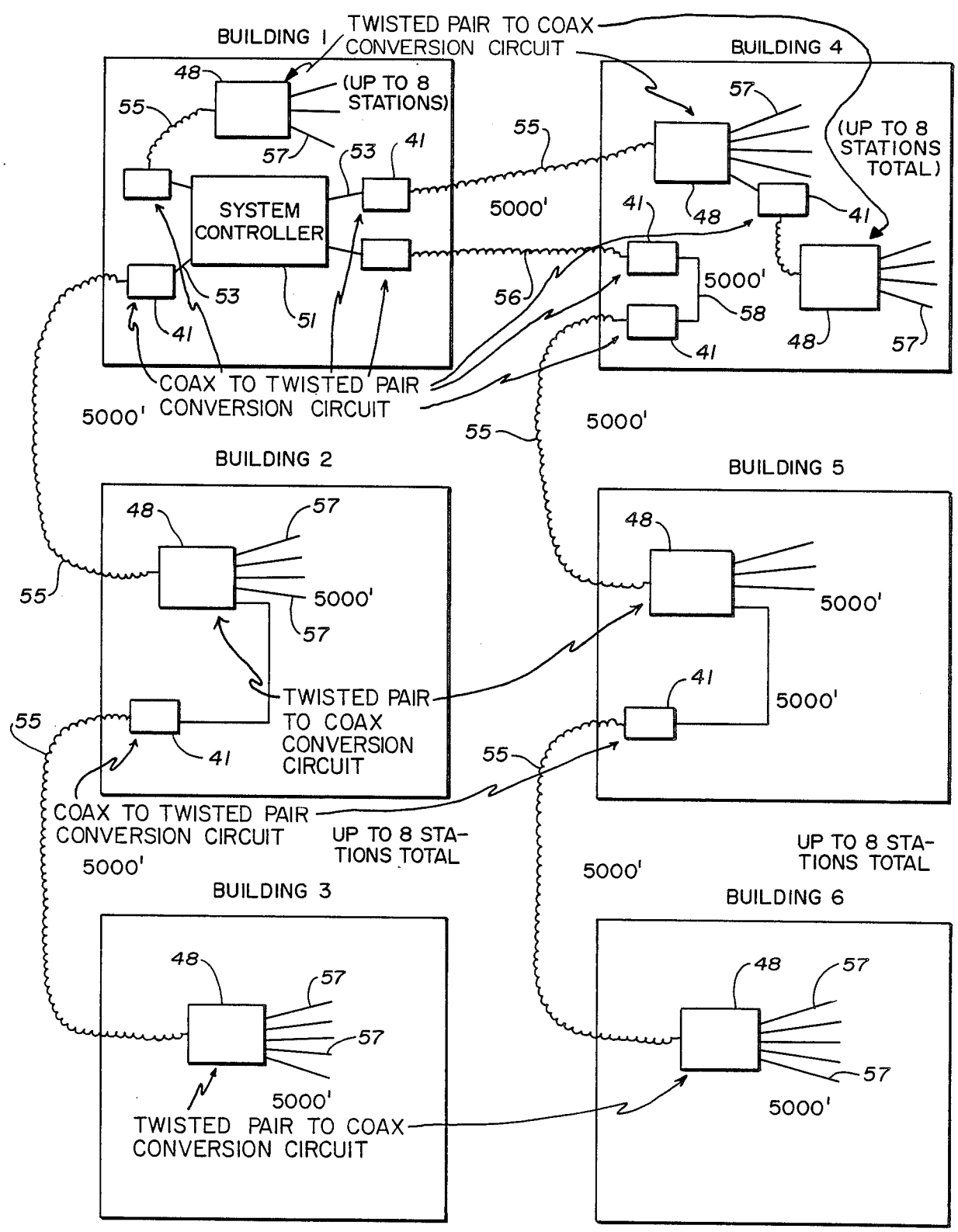

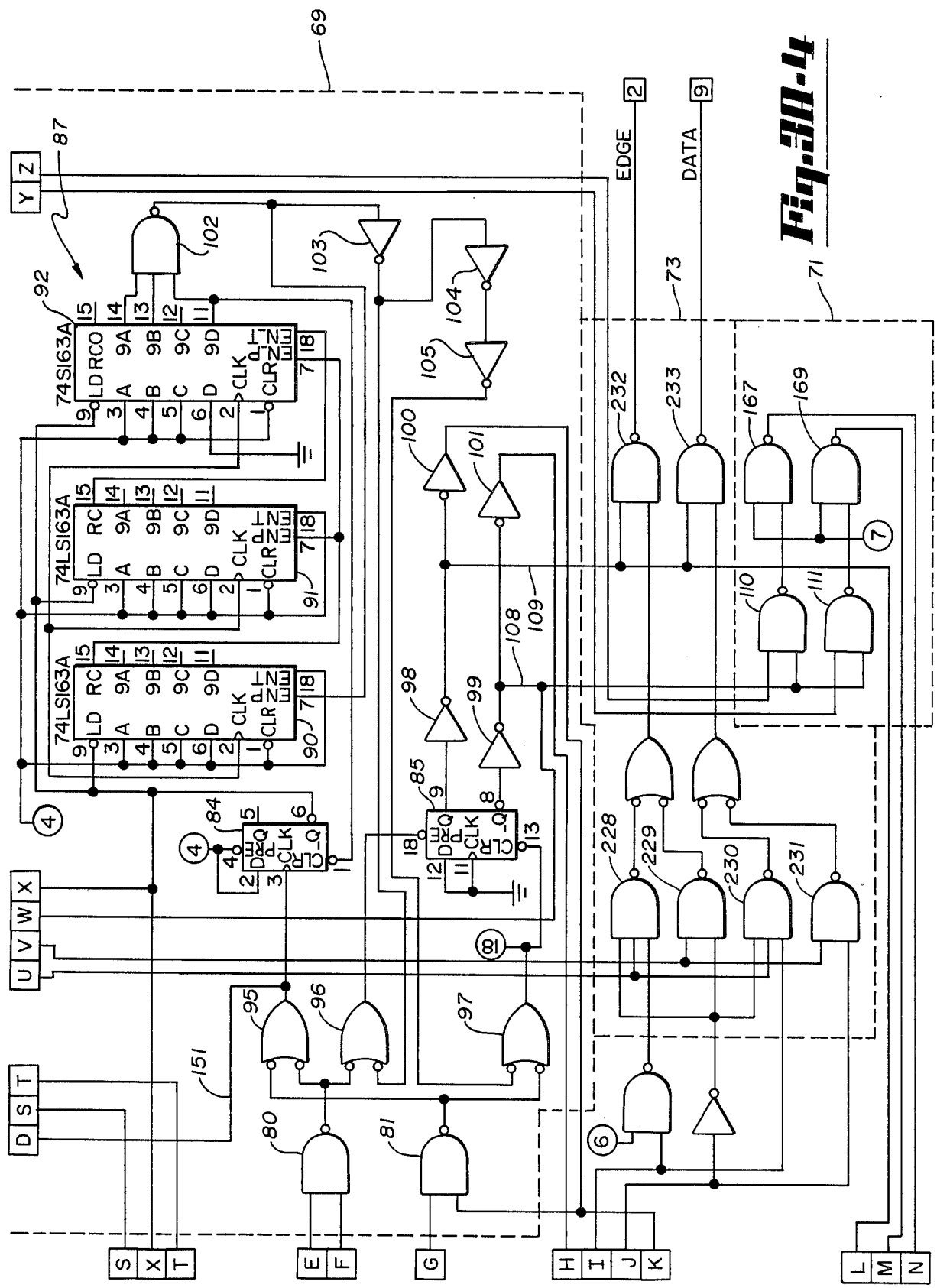

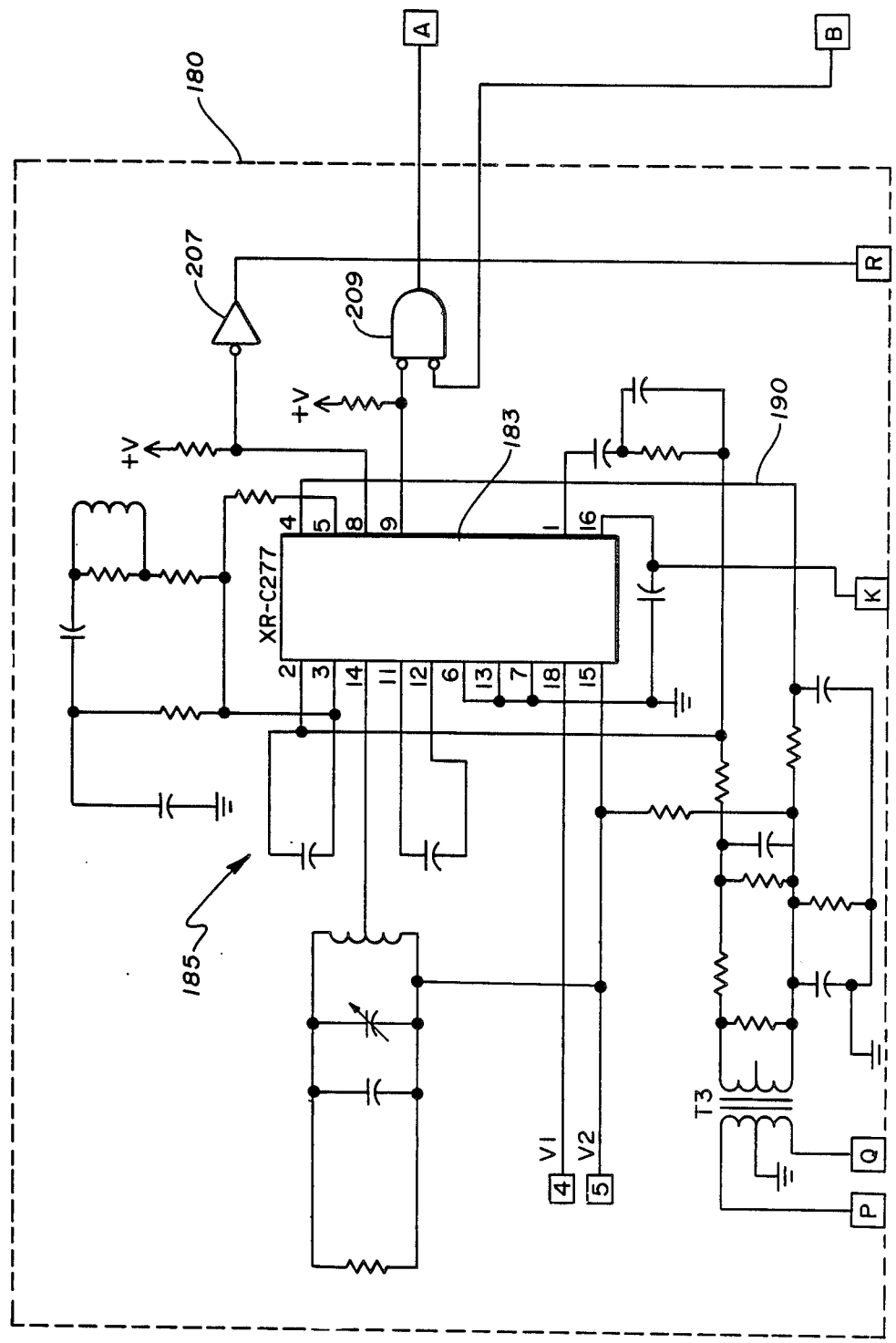

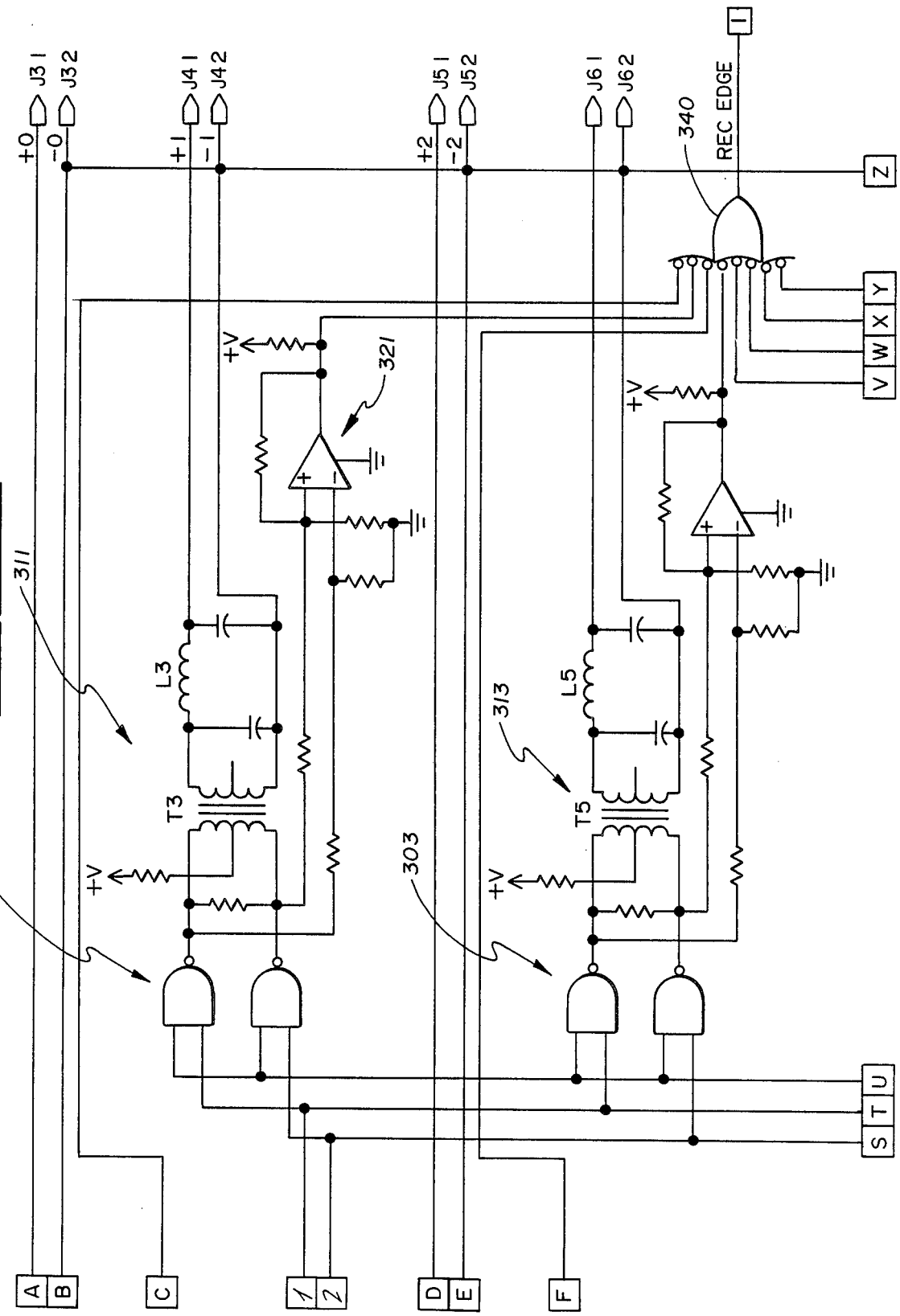

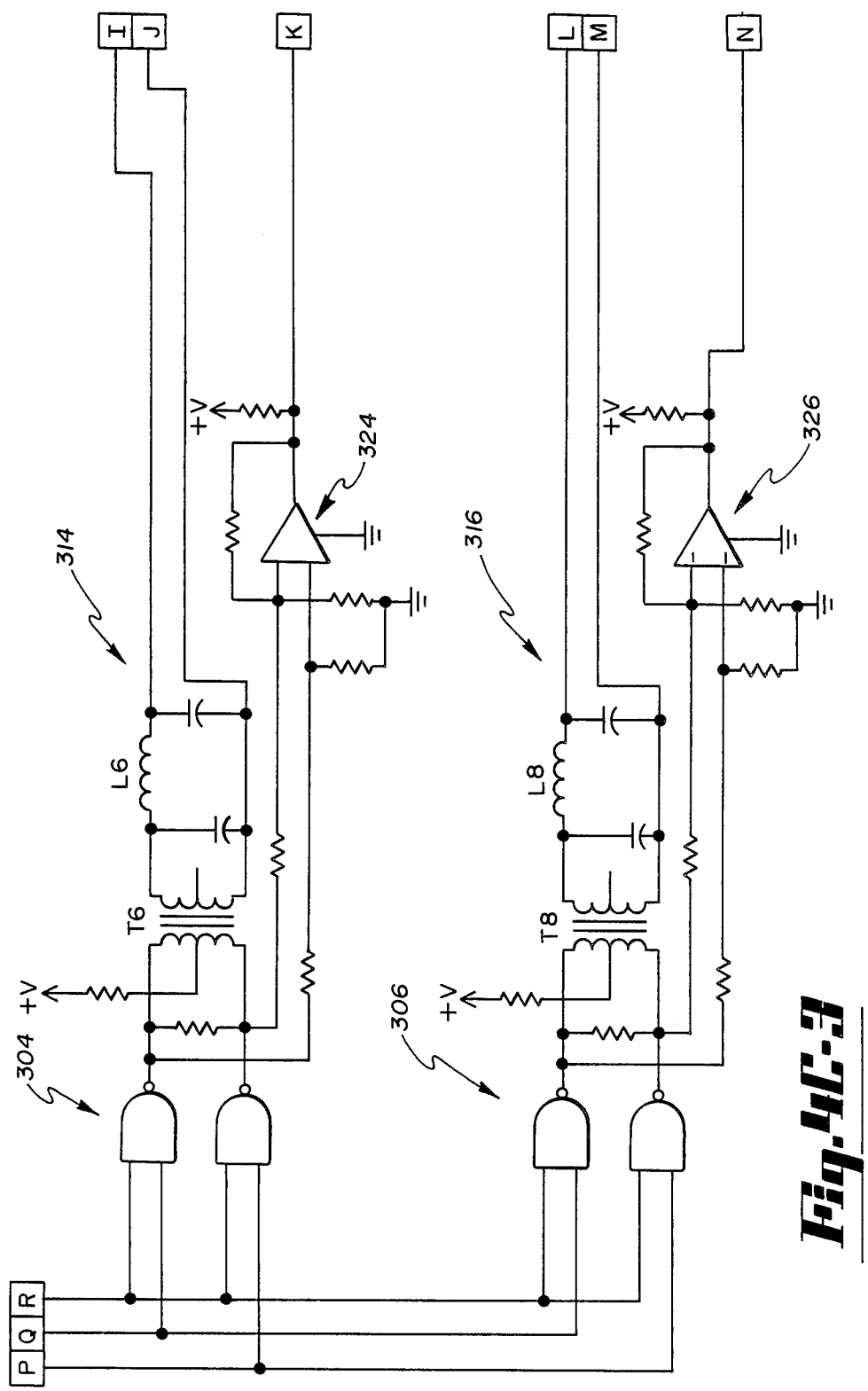

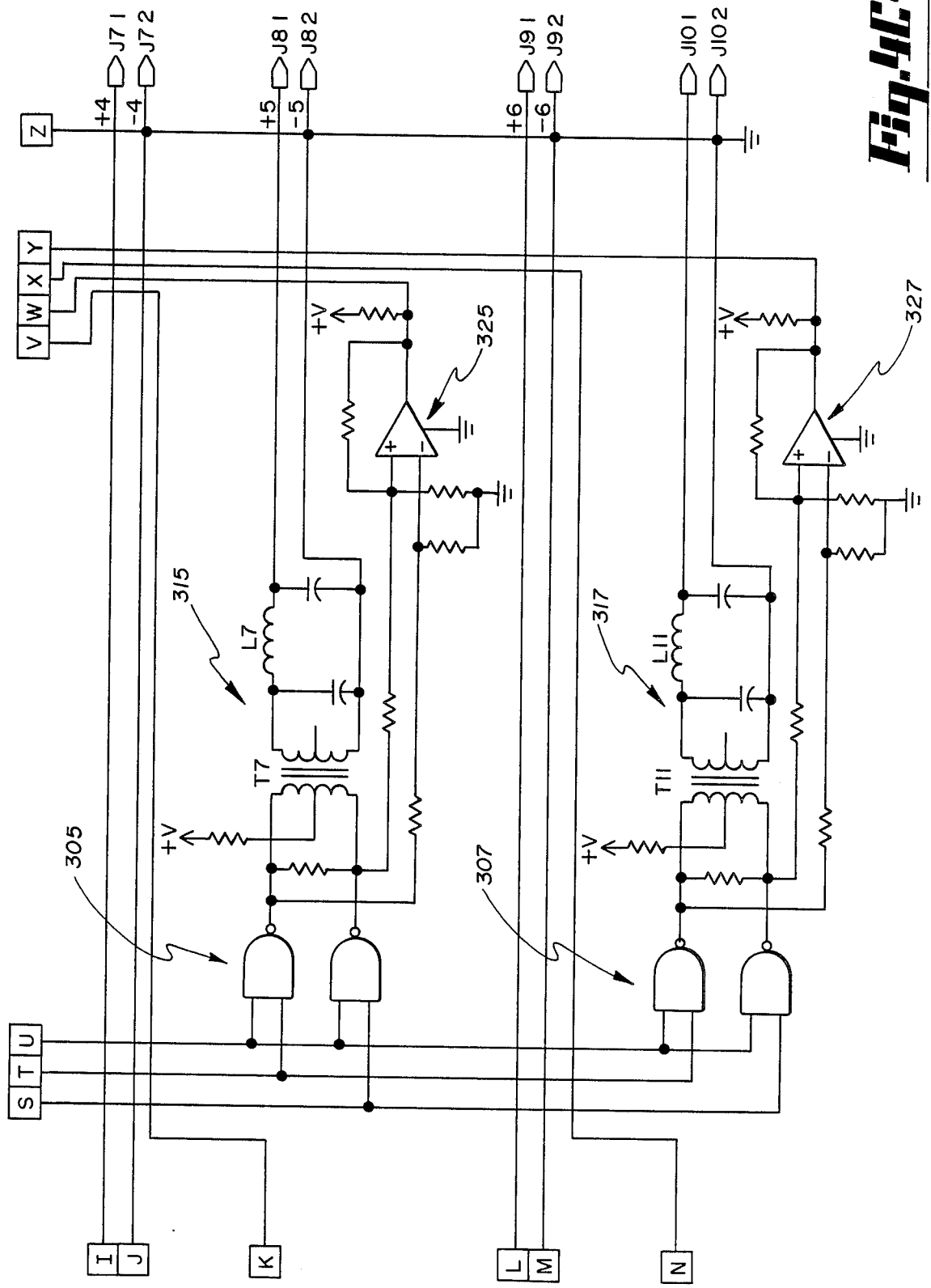

SIGNAL CONVERSION CIRCUIT FOR INTERCONNECTING COAXIAL CABLE AND A TWISTED PAIR

BACKGROUND OF THE INVENTION

The field of the invention is telecommunications systems and particularly telecommunications circuitry which eliminates the need of directly connecting display terminals to a controller with coaxial cable.

Standard multi-terminal computer installations utilize coaxial cable or coax between each terminal on the system and the controller for that terminal. Coaxial cable is very expensive and, if it is to be pulled through raceways, causes additional expense during installation.

Developments in the past have recognized this problem and a number of systems have been achieved to reduce the requirement for coaxial cable in a multi-terminal configuration. These have included the use of a single coaxial cable of up to five thousand feet in length which, when connected to an interface circuit, can operate up to eight terminals. Past developments have also included a four wire, two pair connection between two interfacing circuits with transmission in both directions, one direction on each pair of twisted wire. While the four wire, two pair system enables the transmission of data over longer distances and is substantially cheaper to install than coaxial cable, transmission on a single pair enables the cost of installation or operation of the system to be halved. With a single pair only one leased line need be rented from the local telephone company or the cost of installation is reduced to that necessary for a single pair.

SUMMARY OF THE INVENTION

The disclosed invention enables up to eight display terminals to be operated from one coaxial cable port of a controller. Within five thousand feet of the controller a first interface unit is connected which converts the data from coaxial format to T-carrier format developed by or for Bell Telephone Company. The first interface unit is connected to a second interface unit with a single twisted pair connection such as is commonly used to interconnect telephones.

Both interface units receive and transmit data on the single twisted pair. The second interface circuit can be connected to as many as eight display terminals. Using this telecommunications system the controller is able to poll, transmit to, and receive data from each of the eight terminals as if each were individually connected to the controller by coaxial cable.

The invention is achieved by polling requests to the terminals, and converting data transmission to and from the terminals, which are in a coaxial cable format, to the conventional T-carrier format used for high speed data transmission.

The conventional controller polls terminals by address on each coaxial cable connected to it. Only the appropriate (addressed) terminal receives the transmitted data or responds to a poll.

The first interface circuit is therefore connected to any one coaxial cable emanating from the controller. All signals from that coaxial cable are converted using the disclosed invention from a signal format commonly used on coaxial cable to T-carrier format commonly used on twisted pair.

This signal, which sequentially polls each terminal, is then conducted by a single twisted pair connection which can be up to five thousand feet long. The second interface unit receives the polling information or data transmission. The T-carrier formatted signal is then converted back to coaxial data format and connected to each of as many as eight connected display terminals. When polled, each terminal can receive data or initiate a data return back to the controller prior to the next polling sequence for the next successive terminal addressed. The return signals are formatted and transmitted in the same manner as the signals to the terminals.

To control the data paths separate drivers are utilized for the coax transmissions and the twisted pair transmissions. These drivers are selectively enabled or disabled depending upon the direction of the active transmission.

Since data transmission is being achieved in the half duplex mode, activity on the single pair line will vary between bursts of data and no activity. To maintain proper gain control, sample and hold circuits are employed in each interface module which hold the gain at the last transmitted burst level to compensate for the length of the line, line losses, and the like.

It is an object of the invention to eliminate the need for coaxial cable connections between a controller and each of the display terminals connected to the controller.

It is an object of the invention to eliminate the need of a direct coaxial cable connection between a contoller and any display terminals connected to the controller.

It is an object of the invention to enable data transmissions to and from a single controller and as many as eight display terminals using a single twisted pair of copper wire.

It is an object of the invention to maintain gain control during half duplex data transmissions on a single twisted pair.

These and other objects and advantages of the invention will become clear to those skilled in the art upon a review of the following description of the preferred embodiment and the accompanying drawings and claims.

DESCRIPTION OF THE DRAWINGS

FIG. 1a shows the coax format for data bit 0, FIG. 1b shows the T-carrier format for data bit 0, FIG. 1c shows the coax format for data bit 1 and FIG. 1d shows the T-carrier format for data bit 1.

DESCRIPTION OF THE PREFERRED EMBODIMENT

Figure 1:
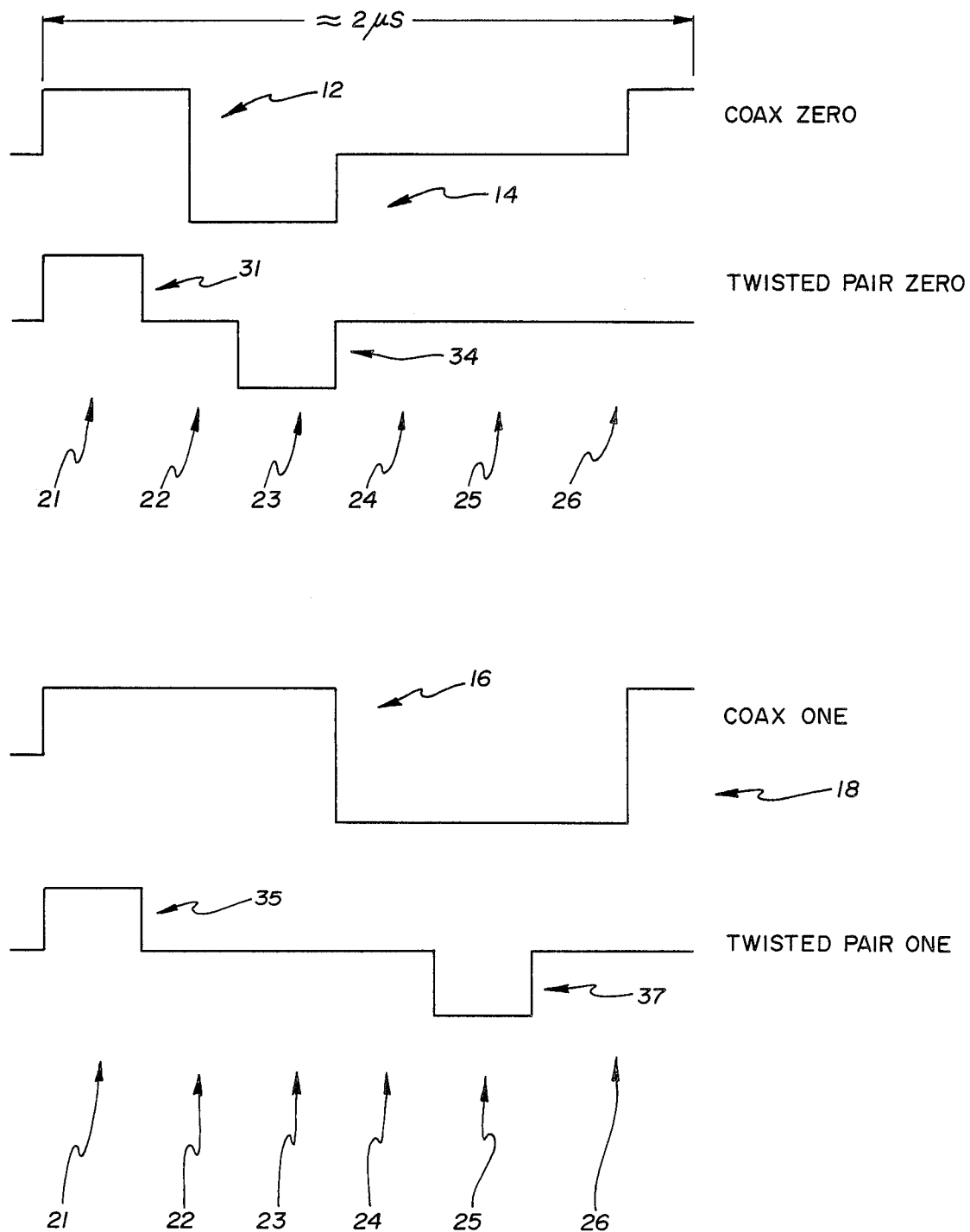
FIG. 1 shows pulse diagrams of computerized data formatted for transmission on coaxial cable and for transmission on a twisted pair.

Shown in FIG. 1 are conventional signal formats for computerized data when transmitted on coaxial cable and on a twisted pair circuit, for example, twenty-two gauge solid copper wires twisted in color coded pairs such as those conventionally used by common carriers for telephone transmissions. The transmission format for twisted pair is commonly referred to as T-carrier high speed data transmission. Shown in FIG. 1a is the coax logic levels for a "0" bit. Shown in FIG. 1b is the T-carrier format logic levels for a "0" bit when transmitted on a twisted pair. Shown in FIG. 1c is the coax logic levels for a "1" bit and shown in FIG. 1d is T-carrier logic levels for a "1" bit when transmitted on a twisted pair.

To achieve a five hundred kilobit per second data rate, each bit must be transmitted within two microseconds. The format for a coax "0" bit, as shown in FIG. 1a, consists of a positive pulse 12 of approximately five hundred nanoseconds followed by a negative pulse 14 of the same duration. The format for a coax "1" bit consists of a positive pulse 16 of approximately one microsecond and a negative pulse 18 of one microsecond as shown in FIG. 1c. The T-carrier format utilizes time slots 21–26 of approximately three hundred thirty nanoseconds each. A T-carrier format for a "0" bit has a timing pulse 31 in the first time slot 21, no signal in the second time slot 22 and a negative pulse 34 in the third time slot 23. The format for a "1" bit also has a positive timing pulse 35 in the first three hundred thirty nanosecond time slot 21 and a negative pulse 37 in the fifth time slot 25.

The instant invention comprises two basic modules 41,48,; a controller interface unit 41 which connects to the system controller for the host Central Processing Unit (not shown) by a single coaxial cable 53, and a display terminal interface unit 48 which is connected to the controller interface unit 41 by a single pair of twisted wire 55 and is connected to as many as eight display terminals (not shown) by coaxial cable connections 57 to each terminal.

Figure 3:
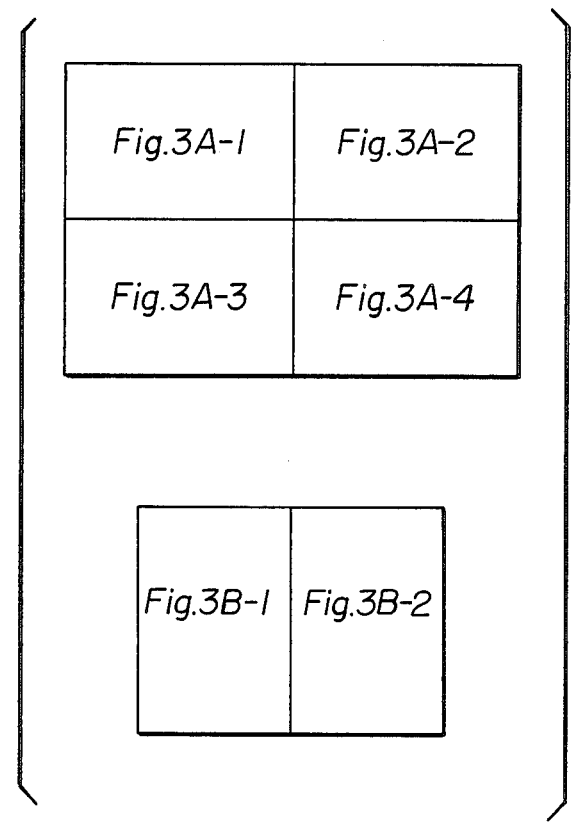
FIG. 3 is a schematic diagram of a controller interface module which is connected to a system controller by a single coaxial cable and is connected to a terminal interface module by a single twisted pair of copper wire.
Figures 1, 3H:
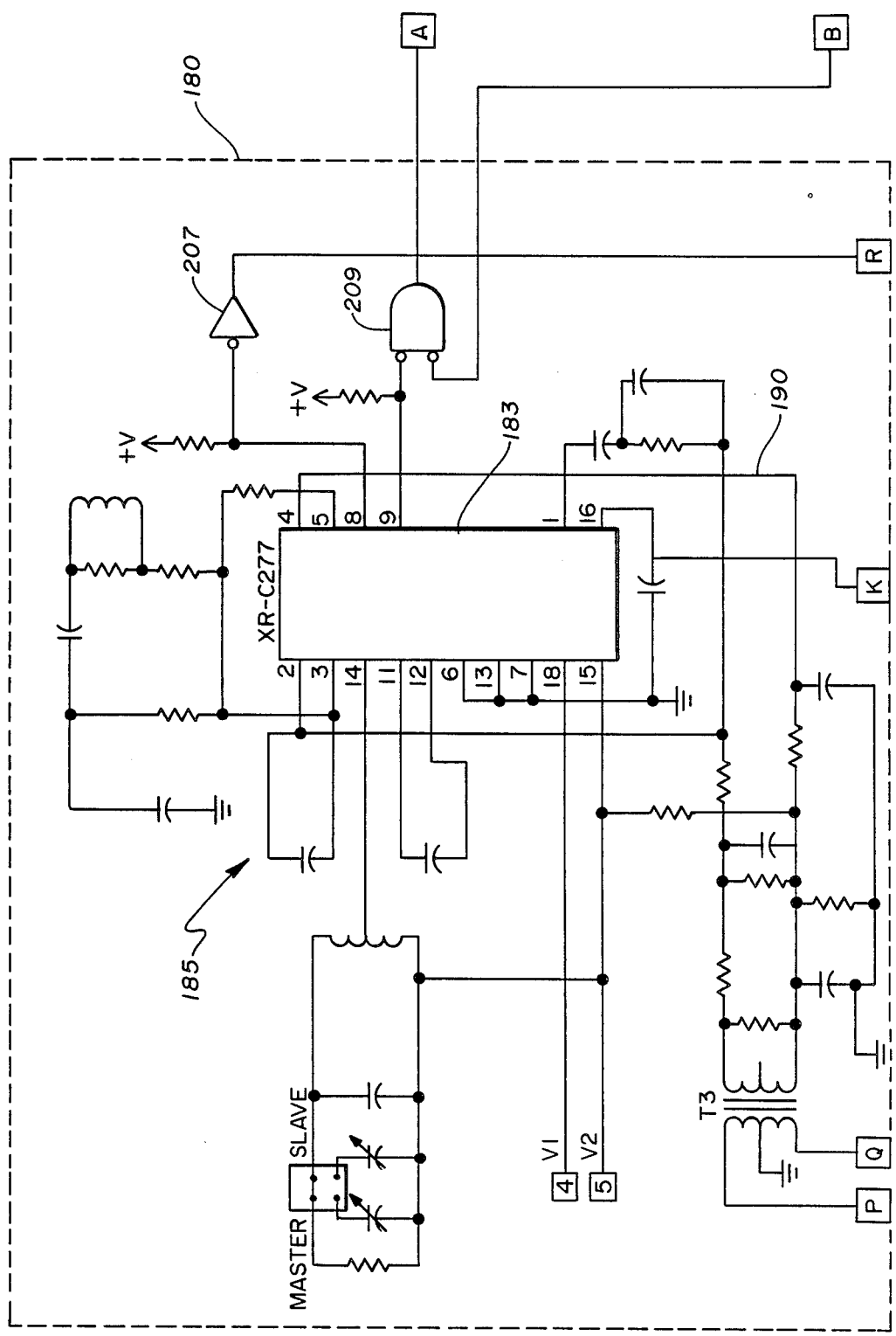
Figures 2, 3A:
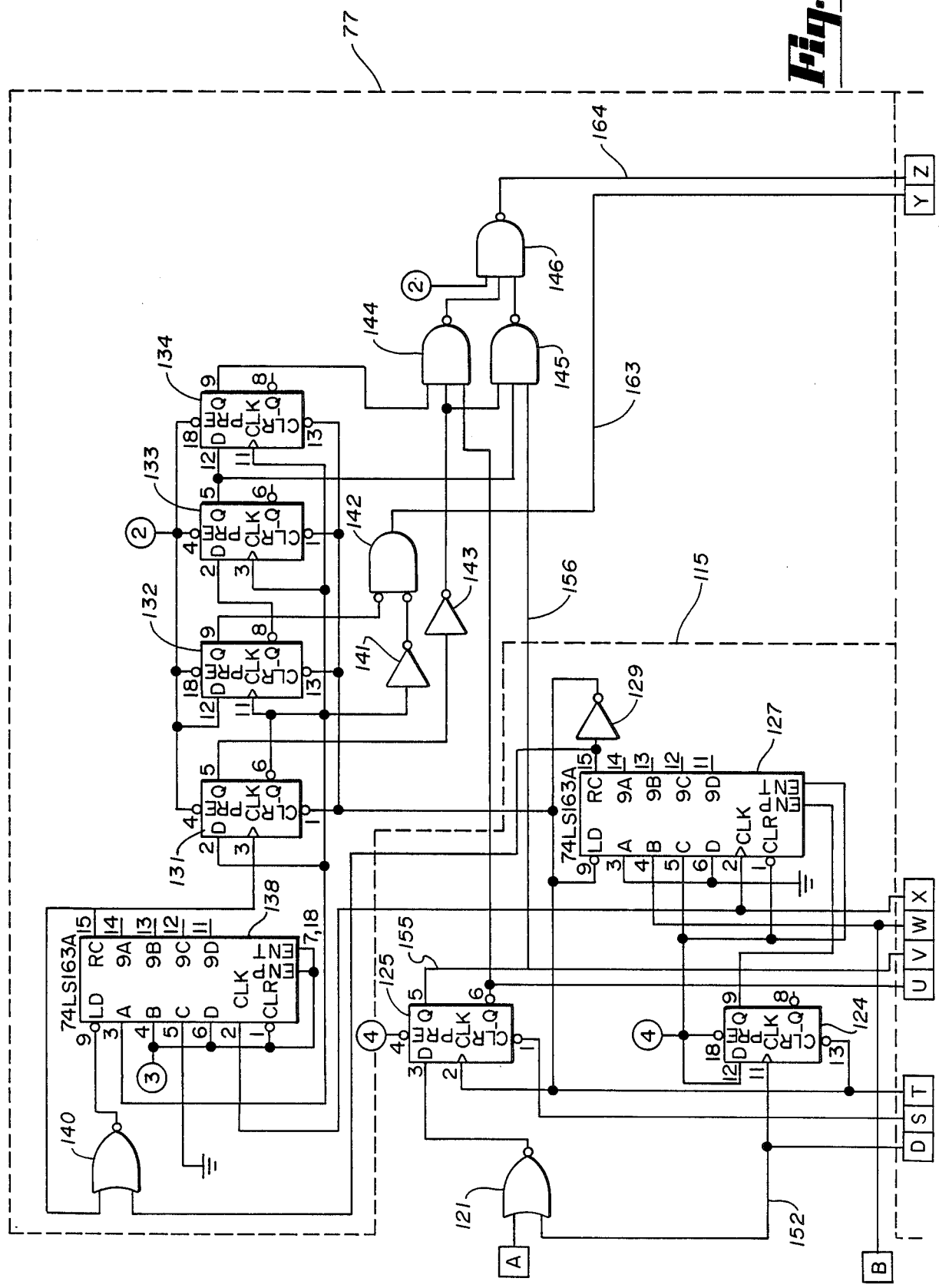
FIG. 2 shows a multiple building application of the present invention. Controller interface modules are connected to the system controller. Each is connected with a single twisted pair to additional controller interface modules or to terminal interface modules.
Figures 1, 3A:
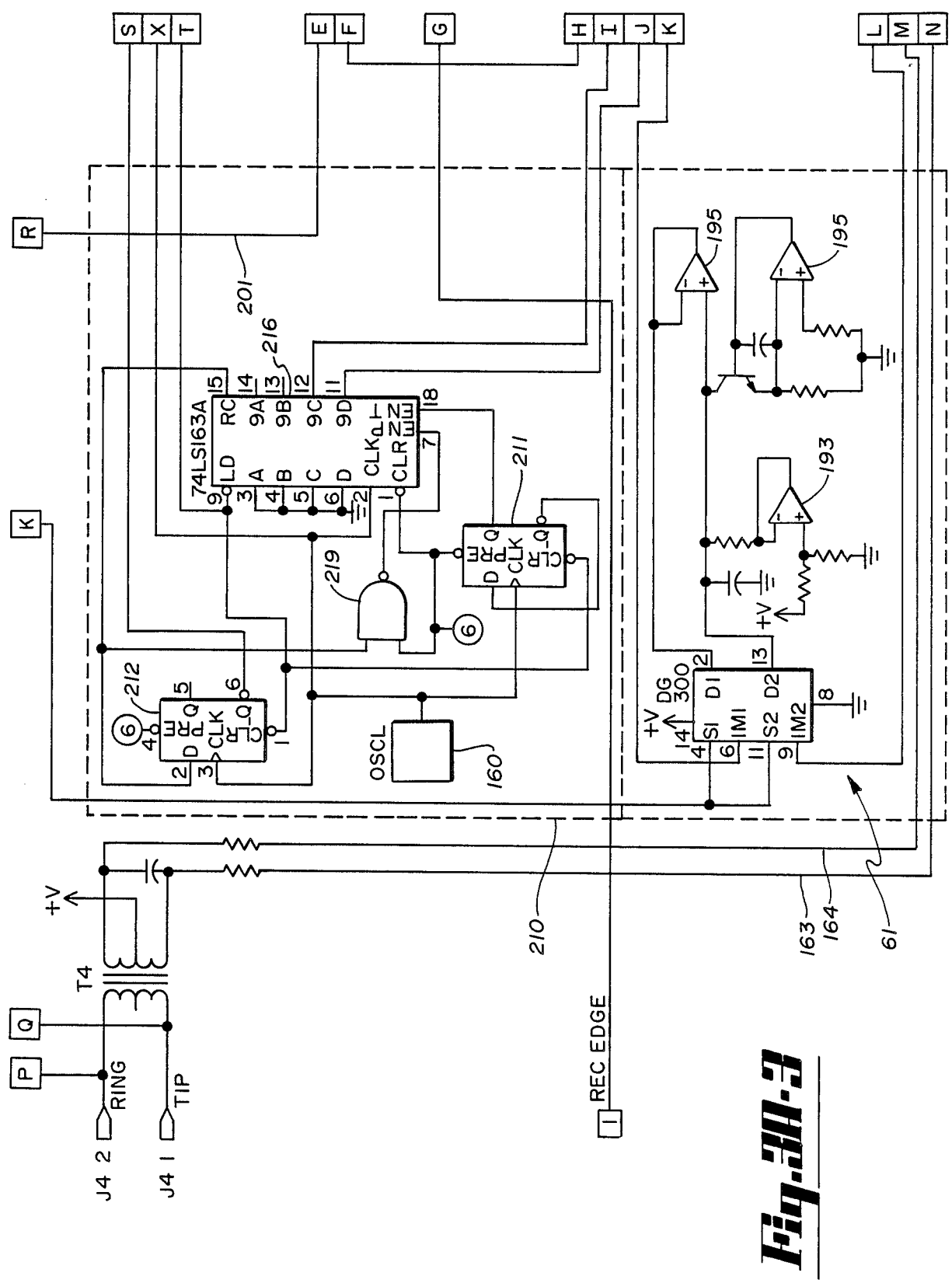
Figures 1, 38:
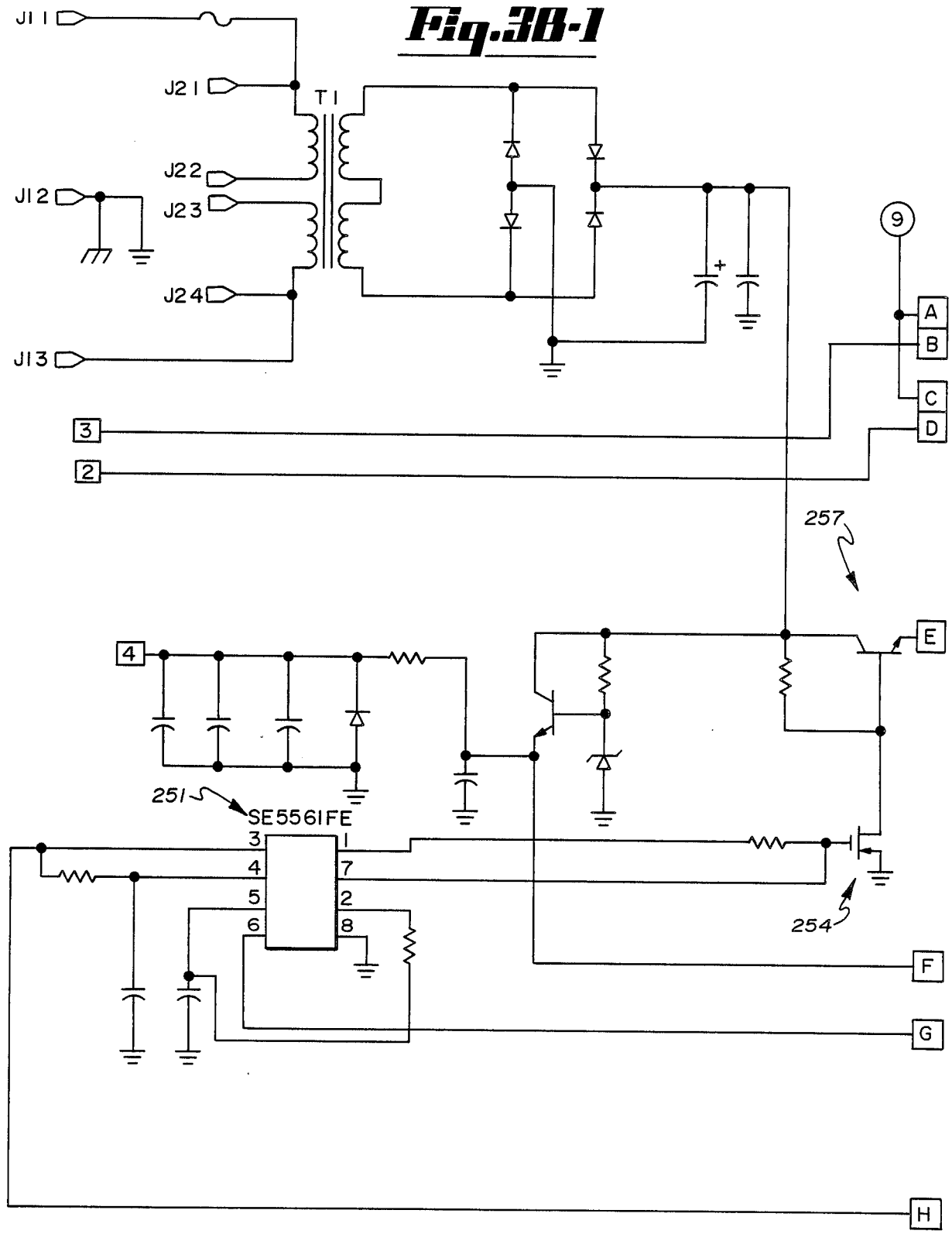

The flexibility of the invention is demonstrated in FIG. 2 which illustrates how a local network of display terminals (not shown) can be connected to a host computer (not shown) in a multi-building network or educational campus. Similar installations could be made on different floors of a single building without having to run coaxial cable between floors. As shown in FIG. 2, one or more controller interface modules 41 may be connected to the system controller 51. When connected by a single twisted pair of copper wire 55 to a terminal interface module 48, each set of modules 41,48 can support up to eight display terminals which are connected with coaxial cable 57. By interconnecting controller modules 41 using alternately twisted pair 56 and coax 58, large distances can be achieved. Additional flexibility is possible by "daisy chaining" the modules 41,48 as shown in FIG. 2. Since the units can be chained, the total distance from system controller 51 to the display stations is limited only by accessability to power and the size of the users facility.

Data transmission between the controller 51 and each of the display terminals is sequential and requires data transmission in both directions. When the controller 51 is ready to transmit data to a specific tube it polls that terminal by address indicating the number of bytes of information that are to be transmitted. The display terminal then responds with a "ready to receive" data transmission. The controller 51 then transmits the data back to the display terminal. In addition, the controller 51 also sequentially polls all terminals connected to the controller 51 to determine whether or not any of the displays have information to be transmitted to the controller 51. If a display terminal has information to transmit, the terminal responds with a "ready to transmit" signal indicating the number of bytes of information that are to be transmitted. The controller 51 then requests the transmission and the display terminal transmits upon receipt of the controller instruction to transmit the data.

When transmitting between the controller 51 and the display terminals on a single twisted pair, 55, line activity will vary between active data being transmitted and no activity on the line. Consequently, the interface units 41,48 must not only convert the data into the proper format for transmission, but each of the interface units 41,48 must also provide a gain control for received signals which compensates for line length, line losses and the like while maintaining signal strength at a sufficient level so that virtually error free transmissions are maintained. This is achieved in the instant invention with sample and hold circuitry 61 in both the controller interface unit 41 and the terminal interface unit 48 which samples the signal level during actual data transmission and holds that signal level during periods of no activity on the line so that subsequent transmissions are received and processed with the proper gain.

Figure 4:
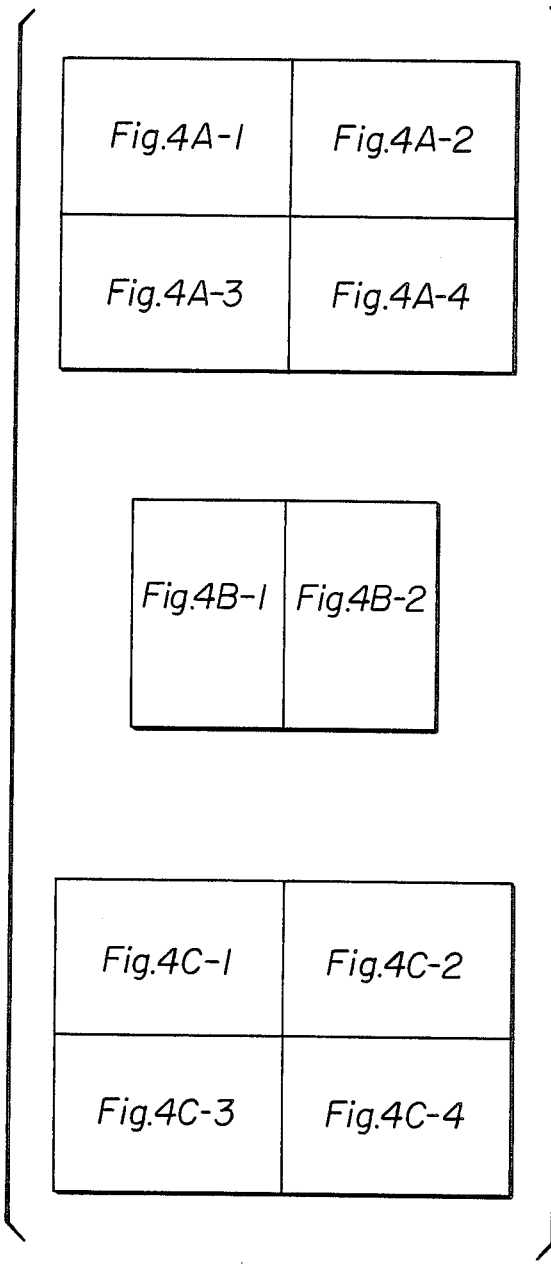
FIG. 4 is a schematic diagram of a terminal interface module which receives and transmits data on the single twisted pair and is connected to as many as eight display terminals by coaxial cable.

Referring to the schematics of the controller interface unit 41, as shown in FIG. 3, and the terminal interface unit 48, shown in FIG. 4, the means and method of converting signal formats and controlling data flow can be understood.

While one data exchange between the controller 51 and any one of the terminals will be described and discussed, it will be understood that all communications from the controller 51 to the terminals and from the terminals to the controller 51 are processed in the same manner.

Figures 2, 3B:
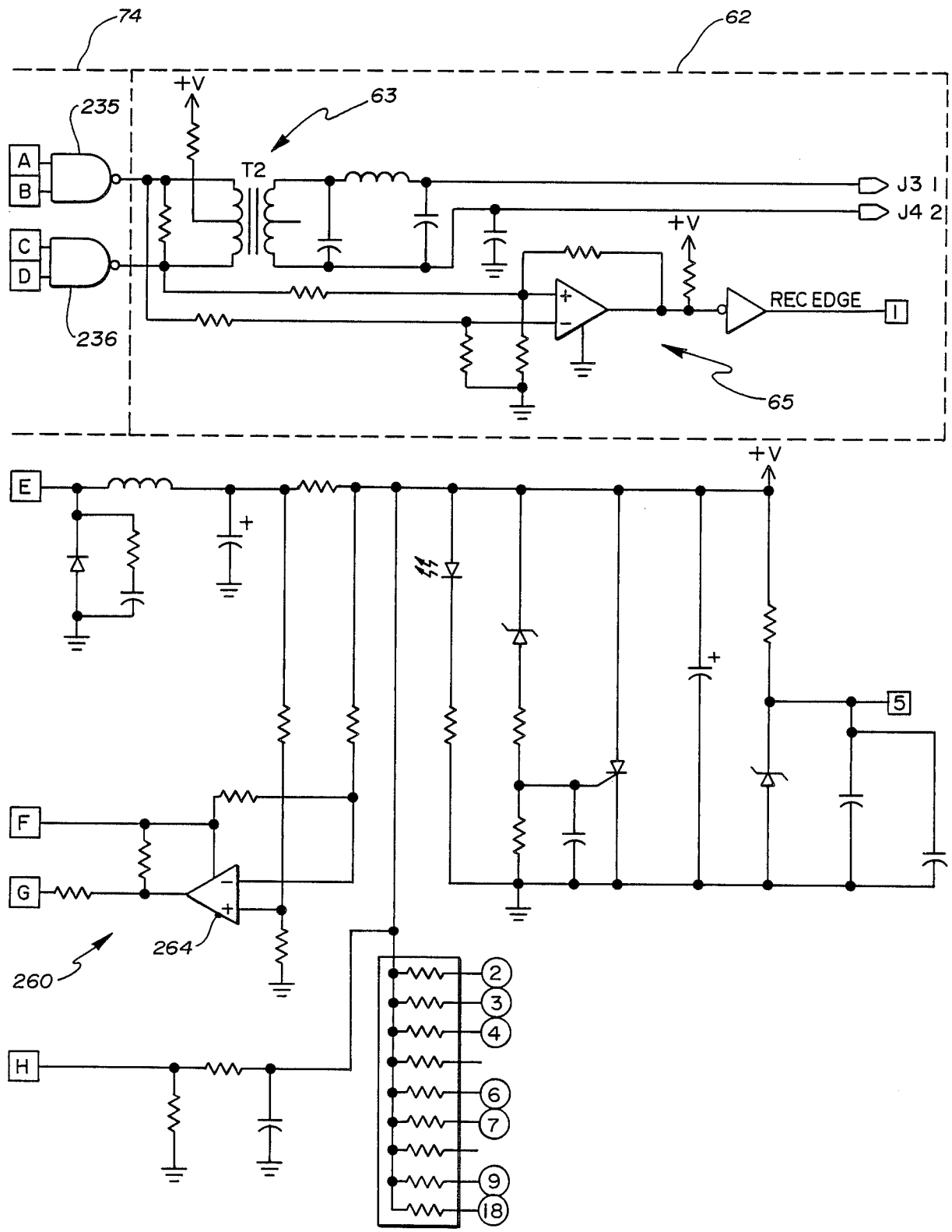

Referring to FIG. 3b the coaxial connection from the controller 51 to the controller interface unit 41 is to a coaxial receiver and transmitter circuit 62 to input jacks J3 1, J3 2. The format of each digital bit of data will be that shown in FIGS. 1a or 1c, five hundred microsecond alternating pulses for a coax zero data bit or one microsecond alternating data pulses for a coax one data bit. This signal is connected through an isolation transformer 63 to an edge detector 65 which determines the duration of the positive transition of the pulse 12 or 16.

As shown in FIG. 3a the received edge of the coaxial data bit is connected to two basic subcircuits. Switching circuit 69 is used to monitor the data transmissions and to control drivers 71,73,74 which coordinate transmission of data on the various communication media, 53,55,57,58. The received edge is also connected to a conversion circuit 77 which converts the coaxial signal to a T-carrier signal suitable for transmission on the twisted pair, 55.

The connection to the switching circuit is through NAND gates 81 to two flip-flops, 84, 85, a three stage timing circuit 87 consisting of three counters 90–92 and a series of logic elements 95–105 which serve to monitor the then current data transmission and to establish a forty-five microsecond delay after the last data bit has been transmitted for any particular data transmission in the then current direction of transmission.

The output of the switching circuit on lines 108, 109 function to enable the active transmission drivers 71 or 73, disable the inactive transmission drivers 73 or 71 and to disable both ports after the switching cycle interval of forty-five microseconds.

For a transmission from the controller 51 to a display terminal the twisted pair output of the controller interface terminal 41 will be active. That is, data transmission will occur on the twisted pair 55 for so long as the controller coaxial signal input is being received.

As indicated above, the duration of the received edge of the positive coaxial input pulse is connected to NAND gate 81. The output of NAND gate 81 is connected through OR gate 97 to flip-flop 85 to remove the clear on flip-flop 85 every time a pulse is received. Flip-flop 85 is used with inverters 98 and 99 to disable the coaxial connector drivers 73, 74 and to enable the driver 71 which are associated with the twisted pair on input pins 2 and 5 of NAND gates 110, 111.

Similarly, each pulse is connected through OR gate 95 to clock flip-flop 84 which loads the counter 87 to start a timing count based on the clock. For each pulse received, counters 90, 91 & 92 are loaded to a predetermined value which will disable NAND gate 102. In this state, NAND gate 102 will prevent flip-flop 85 from being cleared. When the last transmitted data bit is received the counters 90-92 are set to count out an approximate forty-five microsecond time duration, after which both drivers 71, 73 are disabled. Thereafter, the next data transmission is again utilized to establish which set of drivers 71 or 73 will be active so that half-duplex operation is achieved without interference.

The received edge of the coaxial signal from the controller 51 is also connected from the output of OR gate 95 to a bit latch circuit 115 and a conversion circuit 77. The bit latch 115 includes a NOR gate 121, two flip-flops 124, 125 and a counter 127 which functions as a timer, the output of which is inverted with an inverter 129. The coax to twisted pair conversion circuit 77 consists of four flip-flops 131-134, a counter 138, and associated logic elements 140-146. This circuit 77 causes conventional T-carrier formatted bit signals to be emitted through the twisted pair drivers 71 which correspond to the coaxial input signals received from the controller 51.

The resulting output signal, in conventional T-carrier format, must include a first positive timing pulse 31 or 35 having a duration of approximately three hundred thirty nanoseconds, no pulse for the next three hundred thirty nanoseconds, a negative pulse 34 of approximately three hundred thirty nanoseconds if a zero data bit is being transmitted, no pulse if a one data bit is being transmitted, another period of three hundred thirty nanoseconds of no logic level and a negative pulse 37 of approximately three hundred thirty nanoseconds if a logic level one is being transmitted.

With the embodiment shown, conversion is initiated with the bit latch 115 timer 127 set to count approximately five hundred sixty nanoseconds.

The positive portion, bit 12 or 16 of the coax pulse, of either five hundred microseconds for a zero or one microsecond for a one bit is connected from NOR gate 95 along lines 151, 152 to latch 124. The pulse clocks flip-flop 124 on input pin 11 and the Q output, on pin 9, starts timer U21. If the pulse represents a zero bit, or is five hundred nanoseconds long, the timer will not time out until the zero bit has gone away and the conversion circuit 77 will cause a zero bit to be transmitted in the T-carrier 6 format. Flip-flop 124 will be cleared when counter 127 has timed out.

If the pulse is one microsecond long, for a one bit, timer 127 will time out and through inverter 129 will clock flip-flop 125 and clear flip-flop 124, thereby causing a one bit to be transmitted in T-carrier format.

The Q output, on pin 5, of flip-flop 125 is connected along lines 155 and 156 to NAND gate 145, which when high causes a formatted zero bit to be transmitted. The not Q output, on pin 6, of flip-flop 125 is connected to NAND gate 144, which when high causes a formatted one bit to be transmitted.

Timing of the signal is achieved by timer 138 and flip-flops 131-134. Timer 138 is preloaded to a count of ten and counts to a count of fifteen. It is clocked from the sixteen megahertz clock created by oscillator 160 and therefore times out after five clock pulses or approximately every three hundred thirty nanoseconds.

The T-carrier format, as shown in FIGS. 1b and 1d, is created with the use of the four flip-flops 131-134, and the associated logic 141-143, 144-146, connected to the output of the flip-flops 131, 133 and 134. The output of timer 138 on pin 15 is connected to reload the beginning count after each five count cycle. It also clocks flip-flop 131 every three hundred thirty nanoseconds. The Q output of flip-flop 131 is connected through inverter 143 to enable NAND gates 144 and 145 only during the odd time slots 23, 25. The first timing pulse, 31 or 35 which is in the first three hundred thirty nanosecond slot 21 is obtained from the output of flip-flop 131. The not Q output, on pin six, is connected through inverter 141 to NAND gate 142, pin 1. Pin 12 of NAND gate 142, is connected to the Q output of flip-flop 132. Therefore, the timing pulse is emitted whether a formatted one or zero bit is to be transmitted.

The not Q output of flip-flop 132, on pin eight is connected to the D input of flip-flop 133, the next suceeding flip-flop. The Q output, on pin 5, is connected through NAND gates 145 and 146 along line 164 to the drivers 71 for the twisted pair. The Q output of flip-flop 133, on pin 5, is connected to the D input of flip-flop 134 on input pin twelve. The output of flip-flop 134, on pin 9 is connected to NAND gate 144.

Therefore, if a formatted zero data bit is to be transmitted, and NAND gate 145 is enabled by latch 125, the three hundred thirty nanosecond pulse from flip-flop 133 will pass through NAND gates 145 and 146, along line 164 to the drivers 71. If NAND gate 145 is not enabled, a three hundred thirty nanosecond delay (no pulse) will again be caused by the clocked cycle of flip-flop 131 and the high cycle of flip-flop 134 will cause output pin 9, and Q output of flip-flop 134, to go high which is connected to NAND gate 144 to cause the pulse in the fifth time slot 25 to be transmitted through NAND gates 144 and 146 to output drivers 71. NAND gate 144 will be enabled by the not Q output of flip-flop 125.

The timing pulse and data pulses which make up the T-carrier signal are connected along lines 163, 164 from the output of the twisted pair drivers 110, 111, 167, 169 to the opposite ends of one winding of transformer T4 the other winding of which connects to the "tip" and "ring" terminals of the twisted pair, or telephone line, for transmission on the twisted pair to the terminal interface unit 48.

At the terminal interface module 48 the signals are converted back into coaxial format and connected to each of the terminals connected to the terminal interface unit 48. The addressed terminal will respond as appropriate with a "ready to receive" or "ready to transmit" signal. This signal will be converted by the terminal interface unit 48 from coaxial format to twisted pair T-carrier format and will be received by the controller interface unit 41 at the tip and ring terminals designated J4 1 and J4 2.

The received signal is connected across a second isolation transformer T3, which is also used as a step-up transformer, and is connected to a receiver section 180 consisting of a conventionally available T-carrier receiver chip 183, manufacturers designation XR-C 277 and associated components 185.

A reference voltage related to signal intensity is connected along line 190 to a sample and hold circuit 61 consisting of three operational amplifiers 193-195 which samples the voltage while receiving the signal and maintains the proper gain for the receiver chip 183, when no signal is present.

The ouput of the repeater chip 183 on pins 8 and 9 indicate whether a T-carrier zero data bit or a T-carrier one data bit was received on the twisted pair 55. The output of the receiver chip 183 also is connected along line 201 to the switching circuit 69 to enable the coaxial drivers 73 and to disable the twisted pair drivers 71. The receiver 180 is connected to the bit latch 115 and a twisted pair to coax conversion circuit 210 consisting of the module oscillator 160, two flip-flops 211, 212, a counter 216, and a NAND gate 219 which convert a T-carrier formatted zero bit to two alternating pulses of approximately five hundred nanoseconds each as shown in FIG. 1a and converts a T-carrier formatted one bit to two alternating pulses 16, 18, each having a duration of approximately one microsecond for a coaxial formatted one bit as shown in FIG. 1c.

The positive timing pulse, which will produce an output on pin 8 of the receiver chip, is connected through inverter 207 NAND gate 80 or gate 95 to flip-flop 124 and through NOR gate 121 to flip-flop 125 to begin timing for the bit latch 115. The negative pulse 34 or 37, which will occur in the third time slot 23 for a zero bit, as shown in FIG. 1b, or in the fifth time slot 25 for a one bit, as shown in FIG. 1d, produces and output on pin 9 of the receiver chip 183, which is connected through NAND gate 209 and NOR gate 121 to flip-flop 125. The operation of the bit latch is substantially the same as that described for the coax to twisted pair conversion. In other words, the timing count is started upon receipt of the timing pulse from pin 8 of the receiver chip 183. If a zero bit is received, timer 127 will time out, and flip-flop 125 will be latched after the zero bit has gone away. If a one bit is received, timer 127 will time out and, the received pulse for a one bit will be latched into flip-flop 125.

A five hundred microsecond alternating pulse is required for a coaxial zero bit; a one thousand microsecond alternating pulse is required for a coaxial formatted one bit. For a coaxial formatted zero bit signal, the five hundred nanosecond alternating pulse is achieved from the output of flip-flop 125. The Q output, on pin 5, is connected to NAND gates 229 and 231; the not Q output, on pin 6, is connected to the inputs of NAND gates 228 and 230.

The timeout of counter 127 clocks flip-flop 125 and is connected to load counter 216 in the twisted pair to coax conversion circuit 210. The output on pin 12 of counter 216 is five hundred nanoseconds in duration and on pin 11 is one microsecond in duration. Therefore, to generate a zero bit, a pulse is created at the output of NAND gate 228 which corresponds to pulse 12 in FIG. 1a. A second five hundred nanoseconds pulse is created at the output of NAND gate 230 which corresponds to pulse 14. To generate a one bit, a one microsecond pulse is created at the output of NAND gate 229 which corresponds to pulse 16 in FIG. 1c. A second one microsecond pulse is created at the output of NAND gate 231 which corresponds to pulse 18.

Flip-flop 211 is clocked by the sixteen megahertz oscillator 160 and enables counter 216. Consequently, the counter 216 counts at half the oscillator frequency.

Flip-flop 212 is used for reset purposes. It receives, on pin 2, the timeout from timer 216 and the not Q output, on pin 6, is connected to clear the bit latch, 125 on pin 1. Consequently, the bit latch 115 is cleared two microseconds after the last bit has been transferred.

The output of the bit latch 115 and conversion circuit 210 is connected to the coaxial drivers 73, 74 to be transmitted to the controller 51.

As with the prior transmission circuit four NAND gates 232, 233 and 235, 236 are utilized, two of which, 232 and 233, are enabled by the switching circuit 69 when the twisted pair to coaxial transmission path is utilized and two of which, 235 and 236, are connected across the isolation transformer 63 to connect the signal to the coaxial cable connected to the controller 51.

Using the polling sequence identified above data is exchanged between the controller 51 and each of the remote terminals according to the polling sequence.

Also shown in FIG. 3b is power supply circuitry which includes a power controller chip 251 which is connected through a field-effect transistor 254 to a switching transistor 257 to supply load current to the interface module 41 or 48. Over current protection is provided by a current sensing circuit 260 comprising an operational amplifier 264, the output of which is connected to the power controller chip 251 to protect the circuitry.

Figures 2, 4A:
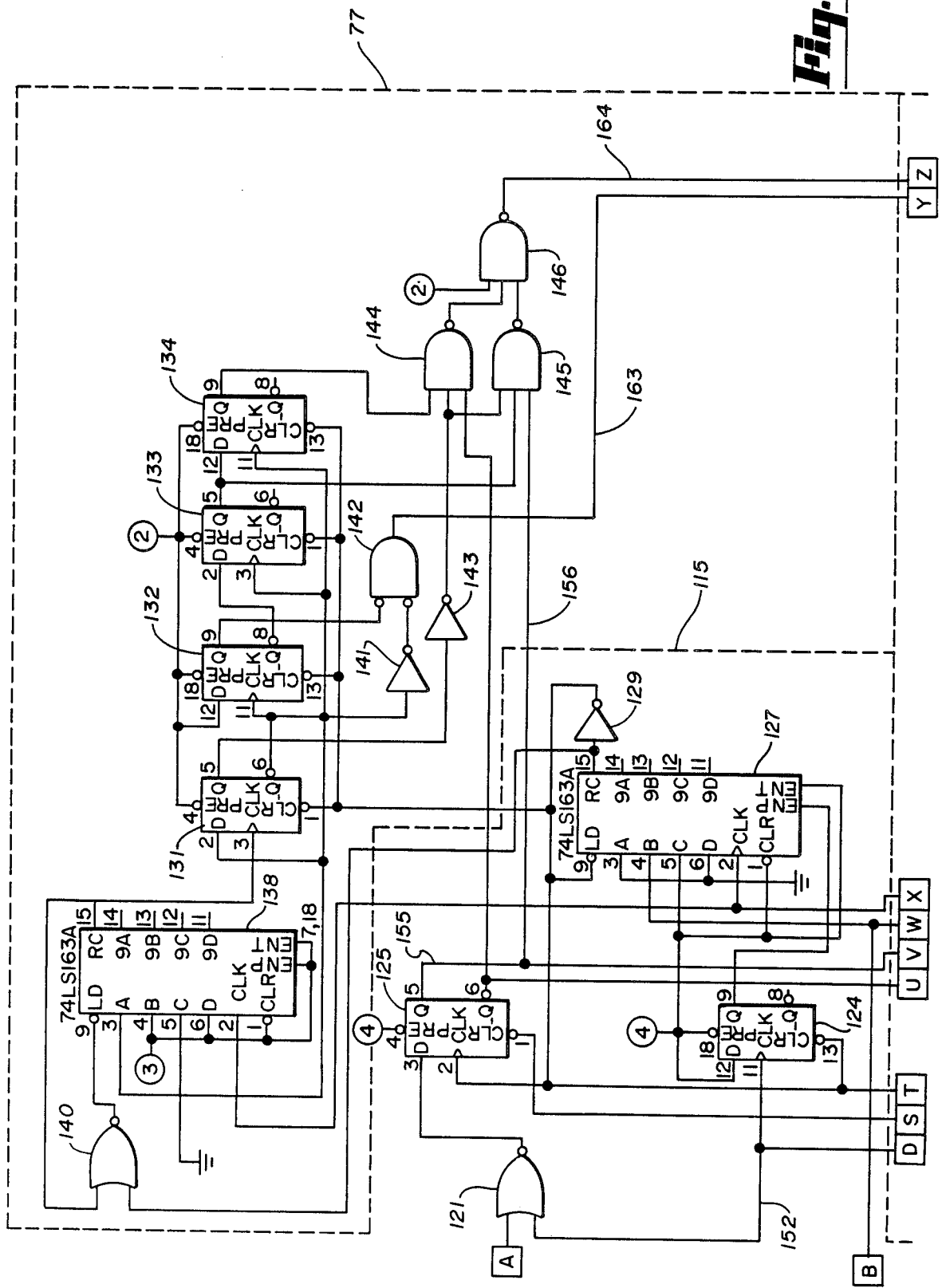
Figures 3, 40:
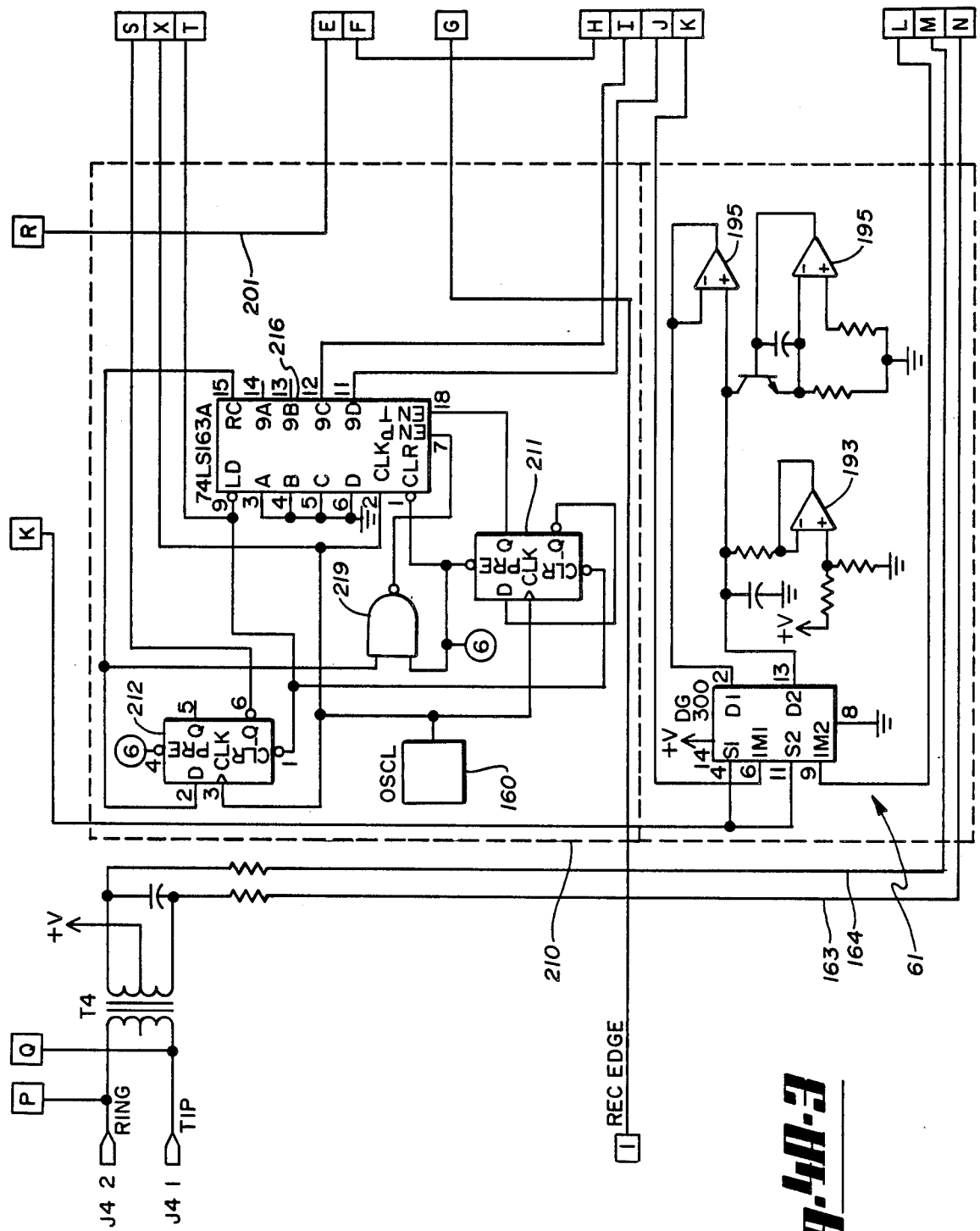
Figures 4, 4A:
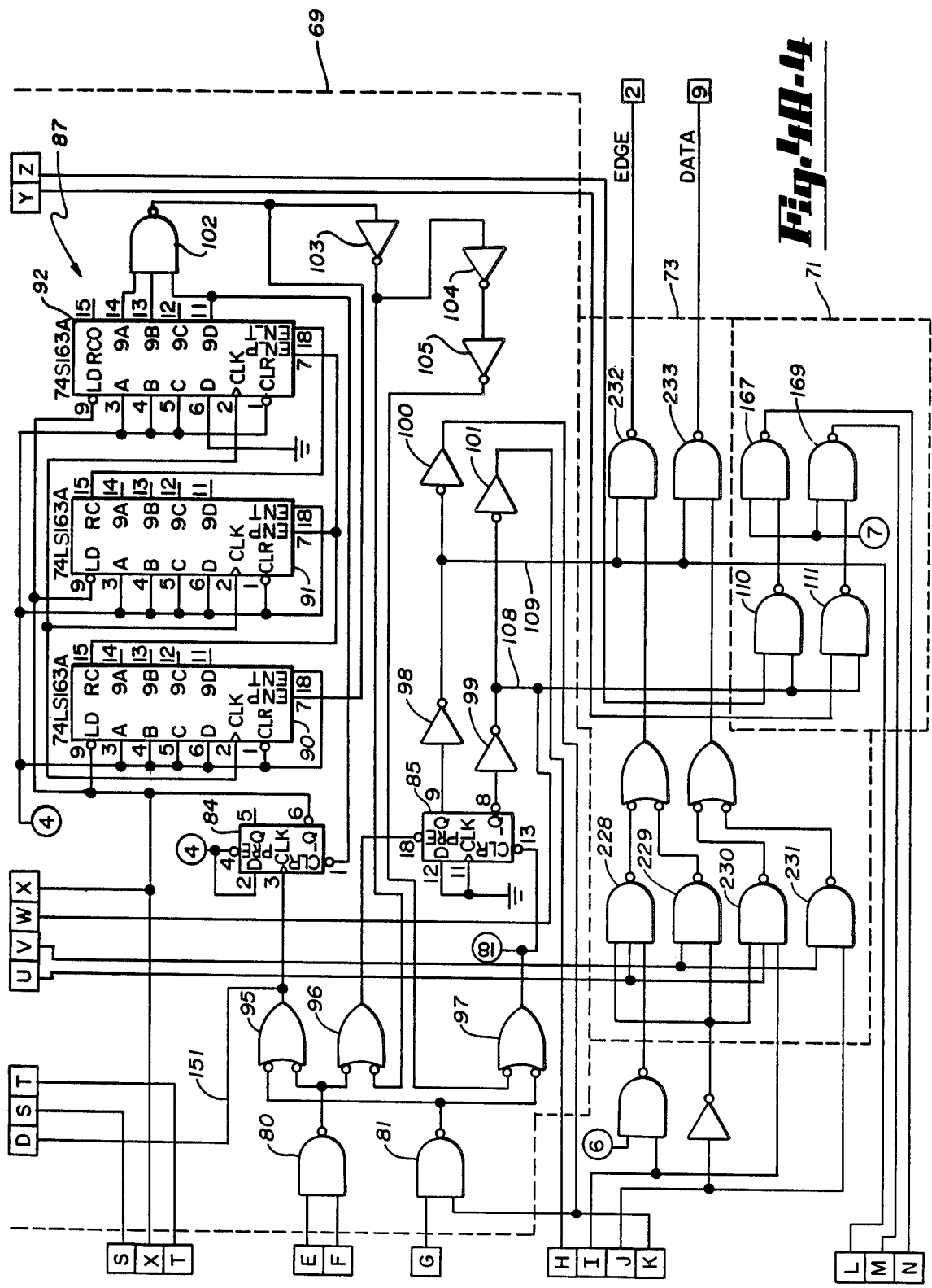
Figures 1, 4B:
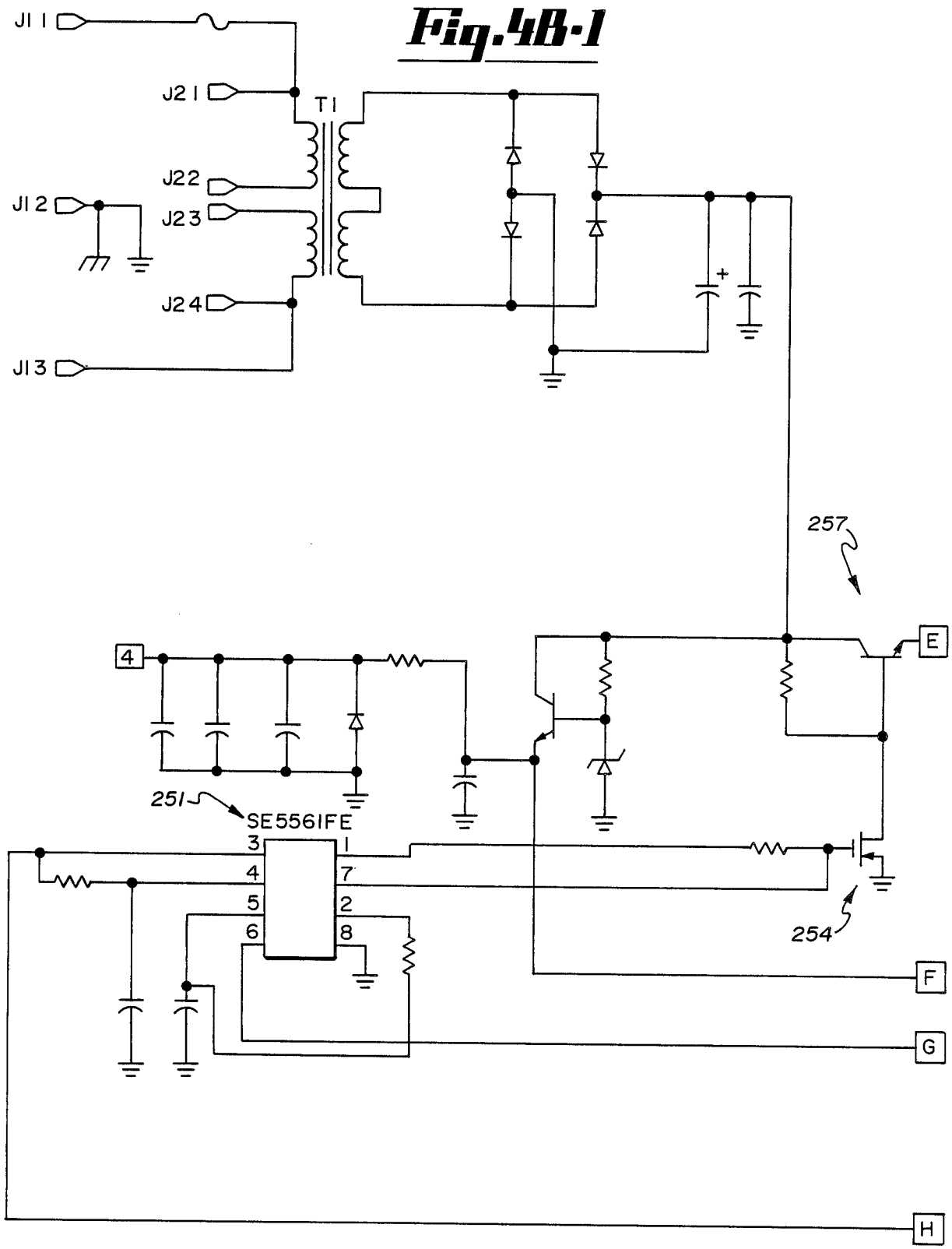
Figures 2, 4B:
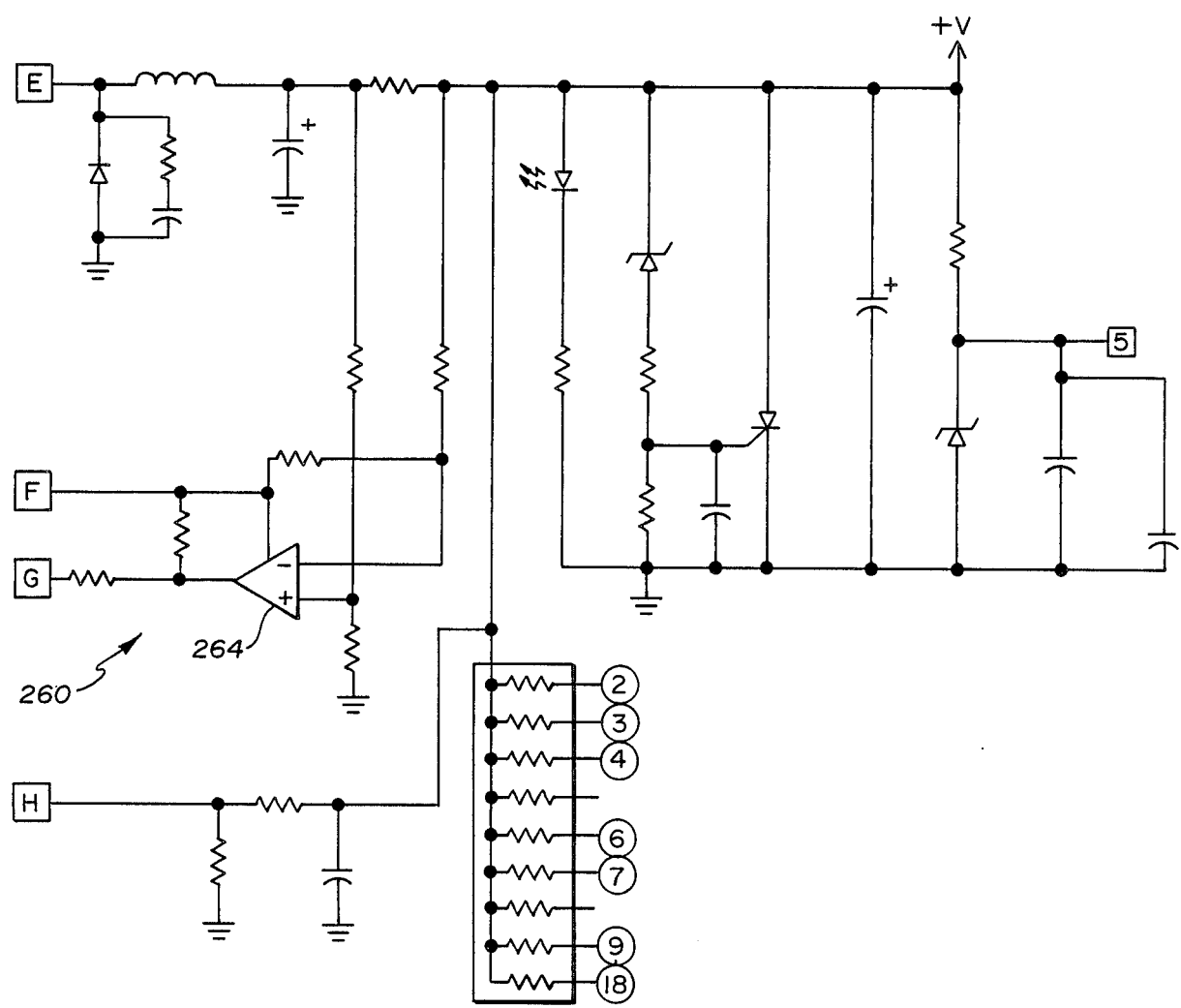
Figures 1, 4C:
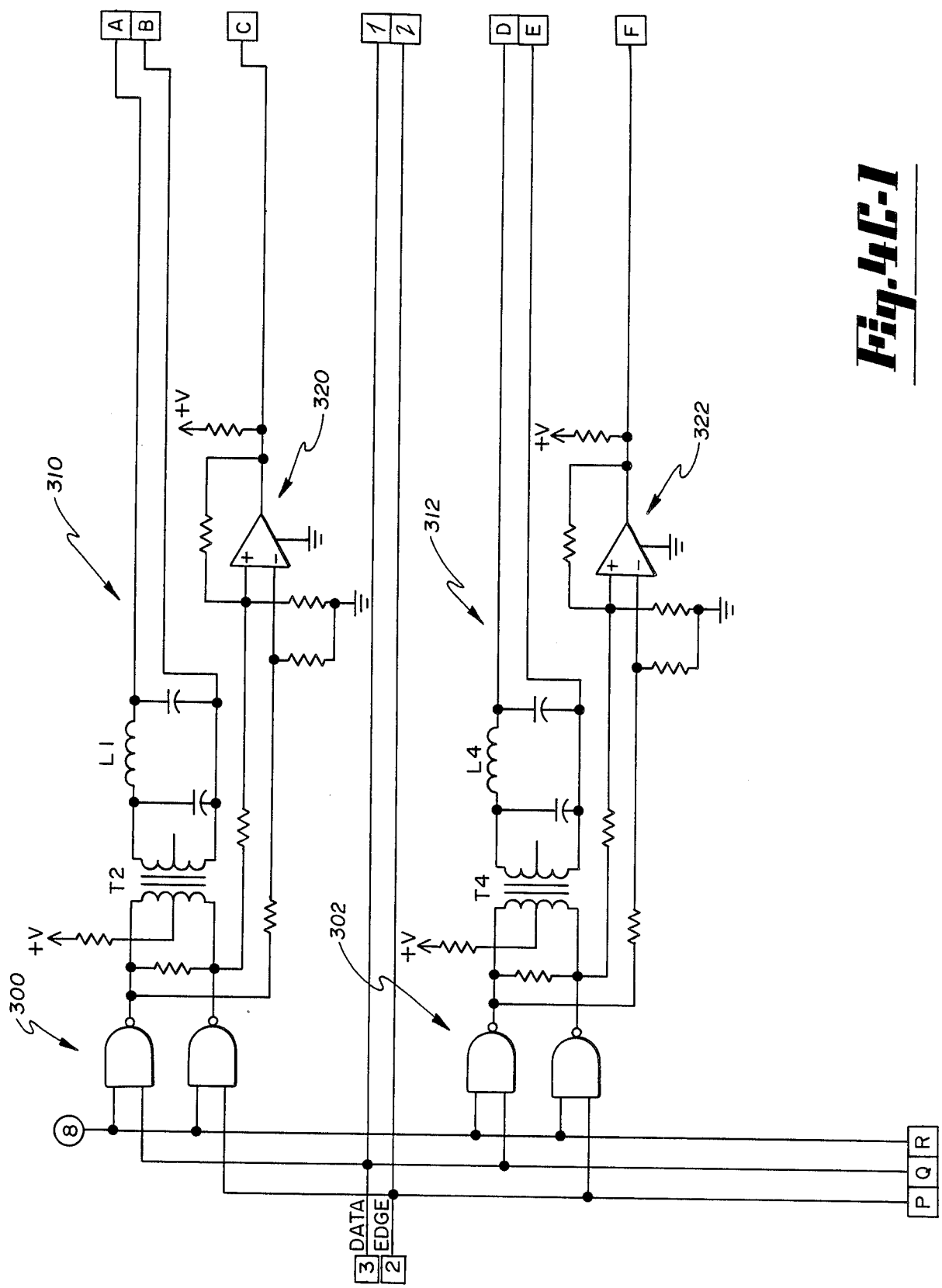

Referring to FIGS. 4a and 4c, the terminal interface unit 48 is shown in schematic form.

The components are substantially identical to the components described in connection with the controller interface unit 41. Each is designated by similar characters and operates in substantially the same way to receive data input on the twisted pair and convert it to coaxial data format to be connected to the display terminals and to receive data from the terminals in coaxial format and convert it to T-carrier format for transmission on the twisted pair.

As shown in FIGS. 4a and 4c, the data is connected to each of the eight terminals and data input from each of the data terminals is connected to the coaxial conversion circuit in the same manner as the single coaxial cable from the controller 51 was connected to the controller interface unit 41. Since the controller 51 addresses each terminal sequentially, only one terminal at a time will respond to a poll from the controller 51, and only one terminal at a time will actually transmit data or receive and decode transmitted data.

As shown in FIG. 4c, to accomodate the eight display terminals of the perferred embodiment, eight sets of coaxial drivers 300-307 are utilized as well as eight isolation transformers T2-T11 and eight receiver and transmitter circuits 310-317, each circuit having an edge detector 320-327 corresponding to edge detector 65 in FIG. 3b. The received inputs on terminal jacks J3-J10 to the receiver and transmitter circuits 310-317 are connected to a multiple input OR gate 340, the output of which is connected to the coax conversion circuits shown in FIG. 4a. The output from the conversion circuits of FIG. 4a are connected to the drivers 300-307, across the transformers T2-T11, and the terminals connected to jacks J3-J10. Each operates in the manner described in connection with controller interface unit 41 with, as noted above, only the active terminal responding to a polling sequence from the controller 51.

Having described a preferred embodiment of our invention it will be obvious to those skilled in the art that other components can be used to perform the conversion and monitor transmission of data using the method of transmitting and receiving data described in connection with the preferred embodiment of the invention. For example, if a single remote display terminal is desired, two interface units of the type designated as a controller interface unit 41 can be employed with satisfactory results. All such variations and modifications are intended to be within the scope of the appended claims.

We claim as our invention:

1. An interface module for converting computerized data transmitted via coaxial cable to a different transmission format for transmission on a single communications medium other than coaxial cable, the interface module comprising:
   at least one coaxial connection;
   means for receiving the computerized data at high speed in a conventional bipolar coaxial format of the type having a positive pulse immediately followed by a negative pulse, the pulse width of the true state of the signal being twice as long in duration as the pulse width of the false state;
   means for converting the computerized data to a bipolar digital format suitable for high speed transmission on the communications medium said bipolar transmission format being characterized by a first positive pulse followed nonsequentially by a second negative going pulse, the true and false state of the signals being determined by the time divided position of the negative going pulse;
   means for transmitting the digital data on the communications medium in the converted format;
   means for receiving data in the format transmitted on the communications medium;
   means for converting the data from the format of the communications medium to the format suitable for high speed transmission on coaxial cable;
   means for transmitting data in the conventional coaxial format suitable for transmission on the coaxial cable;
   means for monitoring each data transmission and controlling the transmission means so that half duplex operation is achieved; and
   means for monitoring the signal level of previous transmissions and controlling the gain of the received signal on the communications medium based on the signal level of the previous transmissions;
   wherein at least one of the means for converting data comprises a bit latch connected to the received signal in the received format to determine whether a true state or a false state is to be transmitted in the converted format by at least one of the means for transmitting data.

2. The interface module of claim 1 wherein the communications medium is single twisted pair of copper wire.

3. The interface module of claim 1 wherein the signal format for the other communications medium is conventional T-carrier format of the type having a positive timing pulse in the first of six time slots and a negative pulse in the third slot if a false state is being transmitted or a negative pulse in the fifth time slot if a true state signal is being transmitted.

4. The interface module of claim 1 wherein the means for transmitting the computerized data comprises means for transmitting the data in the conventional T-carrier format.

5. The interface module of claim 1 wherein the means for receiving data in the format transmitted on the communiations medium comprises means for receiving data in a conventional T-carrier format of the type having a first positive pulse followed by a second negative going pulse, the time divided position of negative pulse indicating whether a false state or zero bit of computerized data is being transmitted or whether a true state or one bit of computerized data is being transmitted.

6. The interface module of claim 3 wherein the means for converting data to coaxial format comprises means for converting the T-carrier formatted signal to the coaxial formatted signal.

7. The interface module of claim 3 wherein the signals are transmitted in nonsequential bursts and wherein the means for monitoring and controlling the gain of the received signal comprises means for monitoring the previously transmitted T-carrier formatted signal and contrlling the gain of the received T-carrier format signal based on the signal level of the previous signal transmission burst.

8. The interface module of claim 1 wherein each of the means for converting data comprises means for converting the data at a data rate of five hundred kilobits per second.

9. The interface module of claim 3 wherein the means for converting the data signal to T-carrierformat comprises a bit latch connected to the means for receiving data to determine whether a one data bit or a zero data bit is to be transmitted in the T-carrier format by the means for transmitting data in T-carrier format.

10. The interface module of claim 3 wherein the means for converting the data from T-carrier format to coaxial format comprises a bit latch connected to the means for receiving the T-carrier formatted signal to determine whether a one data bit or a zero data bit is to be transmitted in the coaxial format by the means for transmitting data in coaxial format.

11. The interface module of claim 8 wherein the means for converting data comprises means to generate a true state in the conventional T-carrier format of the type having a positive timing pulse of approximately 330 nanoseconds followed approximtely 990 nanoseconds later by a negative pulse of appropximately 330 nanoseconds.

12. The interface module of claim 8 wherein the means for converting data to the conventional T-carrier format comprises means to generate a false state in conventional T-carrier format of a type having a positive timing pulse of approximately 330 nanoseconds followed approximately 330 nanoseconds later by a negative pulse of approximately 330 nanoseconds.

13. The interface module of claim 8 wherein the means for converting data to the coaxial format comprises means for generating a false state in coaxial format of the type having a positive pulse of approximately 1 microsecond followed by a negative pulse of approximately 1 microsecond.

14. The interface module of claim 8 wherein the means for converting the signal to the coaxial format comprises means for generating a false state in coaxial format of the type having a positive pulse of approximately ½ microsecond followed by a negative pulse of approximately ½ microsecond.

15. The interface module of claim 1 wherein at least one input to the module is computerized data in the coaxial format and wherein at least one output of the interface module is the same computerized data in the conventional T-carrier format.

16. The interface module of claim 1 wherein at least one input to the inteface module is computerized data in the conventional T-carrier format and wherein at least one output of the interface module is the same computerized data in the coaxial format.

17. The interface module of claim 3 wherein the interface module comprises:
   a plurality of coaxial connections;
   a plurality of means for receiving data in the coaxial format; and
   each means for receiving computerized data in coaxial format being connected to the means for converting the coaxially formatted computerized data signal to the T-carrier format whereby the computerized data received by each means for receiving the computerized data in the coaxial format is converted to the T-carrier format and is sequentially transmitted on the single communications medium.

18. A data transmission system for communicating computerized digital data in a conventional coaxial format of the type having a positive pulse immediately followed by a negative pulse, the pulse width of the true state of the signal being twice as long in duration as the pulse width of the false state on a single communications medium other than coaxial cable, the communications system comprising at least two interface modules to convert the data to and from conventional T-carrier format of the type having a first positive timing pulse followed nonsequentially by a second negative pulse, the true and false state of the signals being determined by the time divided position of the negative going pulse, each interface module comprising:
   at least one coaxial connection;
   means for connecting each interface module to the single communications medium;
   means for receiving a data signal from the coaxial connection in the coaxial format;
   means for converting the coaxially formatted data signal to the T-carrier format;
   means for transmitting the data on the communications medium in the T-carrier format;
   means for receiving T-carrier formatted data on the single communications medium;
   means for converting the T-carrier formatted signals to the coaxial format;
   means connected to the coaxial connection for transmitting data in the coaxial format;
   means for monitoring the signal level of each T-carrier formatted transmission and controlling the gain of subsequent received signals in T-carrier format based on the signal level of the previous transmission; and
   means for monitoring each data transmission and controlling the transmission means so that half duplex operation is achieved so that computerized data which orignates on a single coaxial cable is converted to the T-carrier format and transmitted by the first interface module on the single communications medium and received in the T-carrier format by the second interface module and converted back into the caoxial data format and is connected to and transmitted on the coaxial cable connected to the second inteface module and computerized data in the coaxial format on the coaxial cable connected to the second interface module for transmission is converted to the T-carrier format and transmitted by the second inteface module on the same communications medium and received in the T-carrier format by the first interface module and converted back into the coaxial data format and is connected to and transmitted on the coaxial cable connected to the first interface module.

19. The data transmission system of claim 18 wherein the second inteface module comprises:
   a plurality of coaxial connections;
   means for receiving a plurality of data signals in coaxial format;
   means for transmitting a plurality of data signals in coaxial format; and wherein
   each of the plurality of coaxially formatted signals are transmitted on the signal communications medium in the T-carrier format and T-carrier formatted signals received by the second interface module are transmitted on at least one of the coaxial connections, the controlling means controlling the transmission and receipt of signals so that the half duplex operation on the single communications medium is achieved.

* * * * *

UNITED STATES PATENT AND TRADEMARK OFFICE
CERTIFICATE OF CORRECTION

PATENT NO. : 4,712,210

DATED : December 8, 1987

INVENTOR(S) : Loren G. Davis et al.

It is certified that error appears in the above-identified patent and that said Letters Patent is hereby corrected as shown below:

Column 7, line 46, delete the word "and" and substitute therefor --an--.

Column 10, line 35, delete the word "contrlling" and substitute therefor --controlling--.

Column 10, line 43, dlete the word "T-carrierformat" and substitute therefor --T-carrier format--.

Column 11, line 20, delete the word "interface" and substitute therefor --interface--.

Column 11, line 48, delete the words "negative pulse" and substitute therefor --negative going pulse--.

Column 12, line 26, delete the word "caoxial" and substitute therefor --coaxial--.

Column 12, line 28, delete the word "inteface" and substitute therefor --interface--.

Column 12, line 32, delete the word "inteface" and substitute therefor --interface--.

UNITED STATES PATENT AND TRADEMARK OFFICE
CERTIFICATE OF CORRECTION

PATENT NO. : 4,712,210

DATED : December 8, 1987

INVENTOR(S) : Loren G. Davis et al.

It is certified that error appears in the above-identified patent and that said Letters Patent is hereby corrected as shown below:

Column 12, line 39, delete the word "inteface" and substitute therefor --interface--.

Signed and Sealed this

Twenty-fifth Day of July, 1989

Attest:

DONALD J. QUIGG

Attesting Officer

Commissioner of Patents and Trademarks